United States Patent
Kantor et al.

(10) Patent No.: US 10,414,215 B2
(45) Date of Patent: Sep. 17, 2019

(54) MECHANICALLY DRIVEN TIRE PRESSURE CONTROLLING DEVICE, IN PARTICULAR FOR A COMMERCIAL VEHICLE TRAILER

(71) Applicant: KNORR-BREMSE Systeme fuer Nutzfahrzeuge GmbH, Munich (DE)

(72) Inventors: Kornel Kantor, Kecskemet (HU); Janos Toth, Kecskemet (HU); Tamas Toth, Kecskemet (HU); Andras Voith, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 166 days.

(21) Appl. No.: 15/454,791

(22) Filed: Mar. 9, 2017

(65) Prior Publication Data
US 2017/0174012 A1 Jun. 22, 2017

Related U.S. Application Data

(63) Continuation of application No. PCT/EP2015/070230, filed on Sep. 4, 2015.

(30) Foreign Application Priority Data

Sep. 10, 2014 (DE) .......................... 10 2014 113 064

(51) Int. Cl.
*B60C 23/00* (2006.01)
*B60K 25/08* (2006.01)
(Continued)

(52) U.S. Cl.
CPC .......... *B60C 23/009* (2013.01); *B60C 23/003* (2013.01); *B60K 25/08* (2013.01);
(Continued)

(58) Field of Classification Search
CPC ...... B60C 23/003; B60C 23/009; B60K 25/08
See application file for complete search history.

(56) References Cited

U.S. PATENT DOCUMENTS

| | | | | |
|---|---|---|---|---|
| 5,947,696 A | * | 9/1999 | Baumgarten | ........... F04B 35/06 |
| | | | | 152/418 |
| 6,269,691 B1 | | 8/2001 | Sowatzke et al. | |

(Continued)

FOREIGN PATENT DOCUMENTS

| | | |
|---|---|---|
| CN | 101111400 A | 1/2008 |
| DE | 474 773 C | 4/1929 |

(Continued)

OTHER PUBLICATIONS

International Search Report (PCT/ISA/210) issued in PCT Application No. PCT/EP2015/070230 dated Jan. 4, 2016 with English-language translation (six (6) pages).

(Continued)

*Primary Examiner* — Kip T Kotter
(74) *Attorney, Agent, or Firm* — Crowell & Moring LLP

(57) ABSTRACT

A tire pressure controlling device for a tire of a vehicle wheel filled with compressed air, includes a control valve unit for filling the tire with compressed air and/or venting compressed air therefrom. The control valve unit is supplied from a compressor for generating the tire filling pressure. The compressor for compressing air drawn in from the atmosphere is driven by the mechanical rotary movement of the vehicle wheel, as a transmission disposed therebetween transmits the rotary driving movement of the vehicle wheel to the drive shaft of the compressor unit.

9 Claims, 1 Drawing Sheet

(51) Int. Cl.
 *B60G 11/30* (2006.01)
 *B60T 11/10* (2006.01)
 *B60T 17/00* (2006.01)

(52) U.S. Cl.
 CPC ........ *B60G 11/30* (2013.01); *B60G 2202/152* (2013.01); *B60G 2300/042* (2013.01); *B60T 11/108* (2013.01); *B60T 17/004* (2013.01)

(56) References Cited

U.S. PATENT DOCUMENTS

| | | | |
|---|---|---|---|
| 7,415,869 B2 * | 8/2008 | Beverly | B60T 17/221 73/121 |
| 8,528,611 B2 * | 9/2013 | Wilson | B60C 23/003 152/416 |
| 2004/0216827 A1 * | 11/2004 | Stanczak | B60C 23/004 152/419 |
| 2005/0257872 A1 | 11/2005 | Szykulski | |
| 2006/0102268 A1 | 5/2006 | Loewe | |
| 2007/0214963 A1 * | 9/2007 | Hoffman | B60C 23/003 96/108 |
| 2010/0078109 A1 | 4/2010 | Wilson et al. | |
| 2015/0147199 A1 * | 5/2015 | Chawla | F04B 53/10 417/328 |

FOREIGN PATENT DOCUMENTS

| | | |
|---|---|---|
| GB | 667269 A | 2/1952 |
| WO | WO 93/07014 A1 | 4/1993 |
| WO | WO 01/70521 A1 | 9/2001 |
| WO | WO 2014/051677 A1 | 4/2014 |

OTHER PUBLICATIONS

German-language Written Opinion (PCT/ISA/237) issued in PCT Application No. PCT/EP2015/070230 dated Jan. 4, 2016 (six (6) pages).

International Preliminary Report on Patentability (PCT/IB/338 & PCT/IB/373) issued in PCT Application No. PCT/EP2015/070230 dated Mar. 23, 2017, including English translation of document C2 (German-language Written Opinion (PCT/ISA/237)) previously submitted on Mar. 9, 2017 (Eight (8) pages).

Chinese-language Office Action issued in counterpart Chinese Application No. 201580048878.5 dated Nov. 10, 2017 with English translation (Ten (10) pages).

* cited by examiner

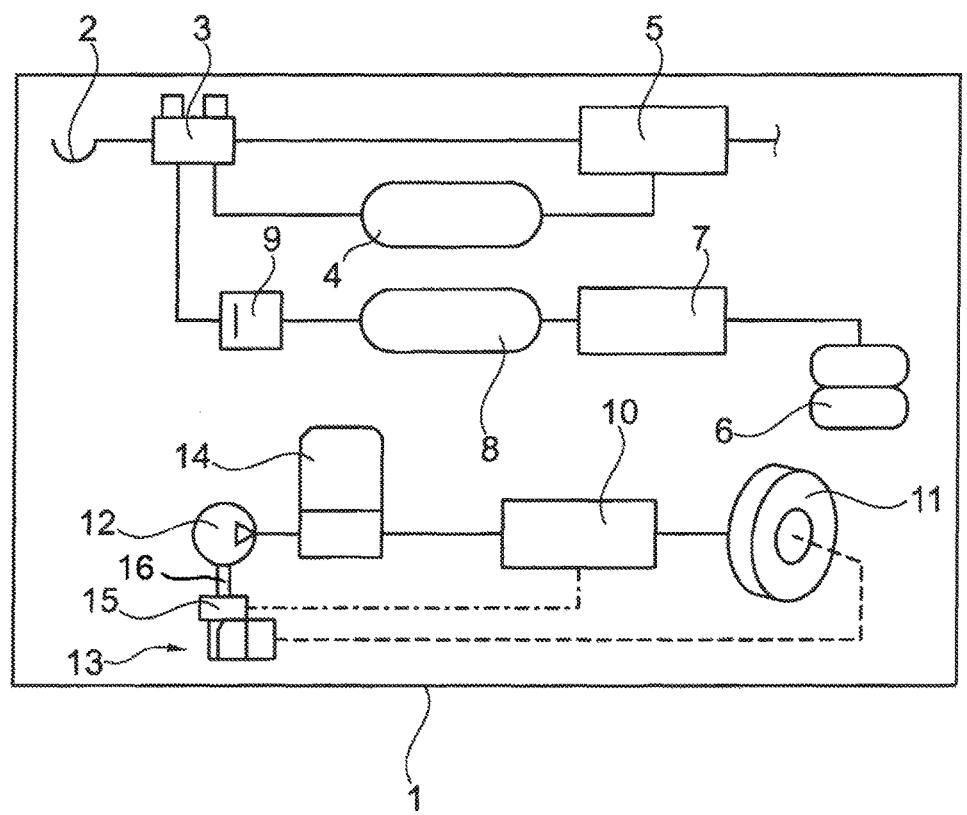

MECHANICALLY DRIVEN TIRE PRESSURE CONTROLLING DEVICE, IN PARTICULAR FOR A COMMERCIAL VEHICLE TRAILER

CROSS REFERENCE TO RELATED APPLICATIONS

This application is a continuation of PCT International Application No. PCT/EP2015/070230, filed Sep. 4, 2015, which claims priority under 35 U.S.C. § 119 from German Patent Application No. 10 2014 113 064.2, filed Sep. 10, 2014, the entire disclosures of which are herein expressly incorporated by reference.

BACKGROUND AND SUMMARY OF THE INVENTION

The invention relates to a tire pressure controlling device for a tire of a vehicle wheel filled with compressed air, including a control valve unit for filling the tire with compressed air and/or venting same therefrom. The compressed air is fed by a compressor device for producing the tire filling pressure. Furthermore, the invention also relates to a method for filling a tire with compressed air, and also to a commercial vehicle trailer which is provided with the tire pressure controlling device.

The field of use of the invention extends primarily to commercial vehicle technology. A compressed air system is already present for a generally pneumatic braking system of a commercial vehicle, the compressed air system generally being fed via its own onboard compressor which is customarily driven via the internal combustion engine of the commercial vehicle. The compressed air produced by this means is generally not solely available only to the pneumatic braking system; for example, a pneumatic suspension device for the vehicle wheels and a tire pressure controlling device, which is of interest within the scope of the present invention, can also be fed in addition thereto.

According to current regulations, the system pressure level of the vehicle compressed air system is limited to a maximum of 8.5 bar. A load-dependent filling of the tires by the tire pressure controlling device takes place depending on the loading of the vehicle. By this means, a lower tire pressure is set in the event of small loading of the vehicle than in the event of higher loading of the vehicle. Since, for this load-dependent filling of the tires with compressed air, pressure levels above the maximum system pressure level of 8.5 bar are also required, namely of up to 9.5 bar, depending on the type of tire, the system pressure level does not suffice for operating the tire pressure controlling device.

WO 01/70521 A1 reveals a tire pressure controlling device with an additional booster device. The booster device is designed as a special pressure intensifier pump with an inlet and an outlet for intensifying the air pressure of the supply of air to the tire. The inlet is connected here to the system pressure supply of the vehicle and the outlet is connected to the tire. The pressure intensifier pump is designed as an alternating piston pressure pump and increases the air pressure by the desired amount above the system pressure. Due to the design, this pressure intensifier pump produces a high loss of compressed air of approximately half of the system compressed air supplied on the input side. This leads to a high consumption of energy.

U.S. Pat. No. 8,528,611 B2 discloses another solution for a tire pressure controlling device with an additional compressor device for producing a high pressure level, which exceeds the system pressure level, for filling the tires. However, in this case, the compressor device is not fed by the system pressure but rather extracts the air to be compressed from the atmosphere. In principle, use is made here only of a separate additional compressor which, because of the drive additionally also required, causes an increased outlay on apparatus technology in comparison to a booster device described above as prior art.

It is therefore the object of the present invention to further improve a tire pressure controlling device of the type in question to the effect that, with a minimal outlay on apparatus technology, a needs-based energy-saving supply of compressed air for filling tires to a high pressure level exceeding the system pressure level is made possible.

The object is achieved by a tire pressure controlling device, a method of operating same, and a commercial vehicle having the tire pressure controlling device, for a vehicle wheel tire charged with compressed air, comprising a control valve unit for controlled filling of the tire with compressed air and/or venting same therefrom, the compressed air being fed by a compressor for producing the tire filling pressure. The compressor for compressing drawn in air from the atmosphere is driven by mechanical rotational movement of the vehicle wheel via a transmission unit arranged therebetween that transmits the rotational driving movement from the vehicle wheel to the drive shaft of the compressor.

The invention includes the technical teaching that the compressor for producing the tire filling pressure is driven by the mechanical rotational movement of the vehicle wheel by a transmission unit arranged in-between that transmits the rotating driving movement of the vehicle wheel to the drive shaft of the compressor.

The advantage of the solution according to the invention resides in particular in the fact that the rotational movement of the vehicle wheel that is present in any case during movement of the vehicle is used, by said rotational movement being branched off via the transmission unit, in order to operate the compressor. By this means, the tire pressure controlling device is independent of the system pressure $p_s$ and can also be provided with a higher pressure level, depending on the power configuration of the compressor, and therefore the maximally achievable tire filling pressure $p_r$ can be greater than the system pressure $p_s$ which can then primarily be used for operating a pneumatic braking system and/or suspension system.

The transmission unit for transmitting the mechanical rotational movement of the vehicle wheel to the drive shaft of the compressor can be designed, for example, as a toothed transmission. This embodiment is appropriate if the transmission unit can be placed in close proximity to the vehicle wheel. If this is not the case and insofar as a greater power transmission distance has to be bridged, it is proposed to design the transmission unit as a chain or belt transmission. Should accommodating the moving traction wheels at the installation location of the tire pressure controlling device be inconvenient, an alternative thereto is to design the transmission unit as a hydraulic pump and hydraulic motor arrangement. In this case, the fluidic power transmission takes place via pressure medium lines which can be accommodated in a fixedly laid manner in the region of the vehicle. The hydraulic pump part of said transmission unit should then be placed in close proximity to the vehicle wheel and the hydraulic motor part should preferably be mounted directly on the drive shaft of the transmission unit.

Furthermore, it is also contemplated to design the transmission unit as an electric generator and motor arrangement. In this case, for the transmission of power, an electric line should be laid in the region of the vehicle. The generator part of said transmission unit should be placed in the region of the vehicle wheel, whereas the motor part can be attached to the drive shaft of the transmission unit. In all of the cases, the transmission unit ensures that a tire pressure controlling device can be realized which can be operated independently of the system pressure network or power supply network of the vehicle and can be driven in a simple manner by the movement of the vehicle wheel in a need-controlled manner.

According to a measure improving the invention, an air dryer unit is connected on the air outlet side of the compressor. The air dryer unit provides for drying of the air drawn-in from the atmosphere by the compressor device before the connected tire is filled therewith. The compressed air which is dried to this extent minimizes the corrosion within the tire pressure controlling device in comparison to undried compressed air. Air is drawn-in from the atmosphere preferably via an air filter arranged on the air inlet side of the compressor.

In order only to put the tire pressure controlling device into operation when needed, it is proposed to arrange a coupling device between the transmission unit and the vehicle wheel driving the latter. The coupling device is preferably actuated by the compressed air need of the tire. This means that the coupling between the vehicle wheel and the transmission unit is connected whenever the tire filling pressure $p_r$ drops below a defined minimum limit. By contrast, the coupling device disconnects whenever the tire filling pressure $p_r$ has reached a defined maximum value of, for example, 9.5 bar. This technical solution provides a simple and robust needs-based activation of the tire filling. As an alternative thereto, it is also contemplated to activate the coupling device via an electric control signal in order to put said coupling device into operation when needed.

In addition, the operating state of the transmission unit can be monitored via a suitable sensor arrangement, for example a revolution counter, in order to determine whether mechanical driving energy is or is not present as a consequence of a movement of the vehicle. This information can be made use of by a master controller for the electric activation of the tire pressure controlling device. This is because, in the solution according to the invention, a movement of the vehicle is a prerequisite for the tire pressure controlling device to be able to be put into operation— preferably via closing of the coupling device.

The solution according to the invention is preferably used in a commercial vehicle trailer and operates there independently of the system pressure $p_s$ supplied via the coupling point. By contrast, a pneumatic trailer braking system can be supplied with the system pressure $p_s$ via the coupling point of the commercial vehicle trailer. It is also contemplated for a pneumatic suspension system to be operated at the same time via said central pressure connection in order to carry out additional pneumatic functions in the commercial vehicle trailer.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic illustration of a tire pressure controlling device accommodated in a commercial vehicle trailer, a trailer braking system and a suspension system.

DETAILED DESCRIPTION OF THE DRAWING

According to FIG. 1, a pneumatic system is arranged within a commercial vehicle trailer 1 (only illustrated schematically), said system being connected via an input-side coupling point 2 to a pneumatic system of a traction vehicle (not illustrated specifically). The compressed-air-producing compressor of the traction vehicle supplies the pneumatic system of the commercial vehicle trailer 1 with a system pressure $p_s$ of a maximum of 8.5 bar. Via a distributor valve 3, the system pressure $p_s$ is primarily supplied to a pneumatic trailer braking system which includes a storage pressure accumulator 4 for storing compressed air for carrying out braking operations, and also a brake valve device 5 via which braking means (not illustrated specifically) can be pneumatically activated.

In this exemplary embodiment, in addition to the pneumatic trailer braking system, a pneumatic suspension system is also connected to the coupling point 2, said suspension system including a pneumatic spring bellows unit 6 (illustrated by way of example) for the suspension of a vehicle axle, which is activated by a spring level valve unit 7 which is fed with compressed air by a storage pressure accumulator 8. The storage pressure accumulator 8 is connected here to the system pressure $p_s$ via a pressure-limiting valve 9 connected upstream.

Irrespective thereof, a tire pressure controlling device which includes a control valve unit 10 for the load-dependent filling of the tire 11 with compressed air is also integrated in the commercial vehicle trailer 1. The compressed air is provided by an independent compressor 12 on the input side of the control valve unit 10. For the compression of air drawn in from the atmosphere, the compressor 12 is driven by the mechanical rotational movement of the vehicle wheel. For this purpose, a transmission unit 13 arranged in-between transmits the rotating driving movement of the vehicle wheel to the driveshaft of the compressor 12.

In this exemplary embodiment, the transmission unit 13 is designed as a hydraulic pump and hydraulic motor arrangement in which (not illustrated in detail) the hydraulic pump is attached to the shaft of the vehicle wheel provided with the tire 11 and the hydraulic motor part is attached to the drive shaft 16 of the compressor 12. The transmission takes place via an oil ring line (dashed line).

An air dryer unit 14 is connected on the air outlet side to the compressor 12 in order to sufficiently dry the compressed air produced by the compressor 12 by suction from the ambient air before said compressed air is provided to the feed pressure connection of the control valve unit 10 so that the latter can undertake filling of the tire 11, which is connected thereto on the working line side, with compressed air depending on the load.

In this exemplary embodiment, the control valve unit 10 electrically activates (chain-dotted line) a coupling device 15 which is arranged on the drive shaft of the compressor 12 in order, depending on need, to be able to undertake a disconnection or a connection of the drive power flux. By this means, a needs-based operation of the compressor 12 is made possible. In this exemplary embodiment, the coupling device 15 is designed as a pneumatically pilot-controlled multi-disk clutch.

The invention is not restricted to the preferred exemplary embodiment described above. On the contrary, modifications thereof are also conceivable and are covered by the scope of protection of the subsequent claims. For example, it is also possible to undertake the activation of the coupling device 15 by the compressed air need of the tire 10, in which the pressure level thereof is used in the manner described above as the activation pressure for the coupling device 15. In addition, it is also possible to design the transmission unit 13 in another way, for example as a toothed transmission.

LIST OF REFERENCE SIGNS

1 Commercial vehicle trailer
2 Coupling point
3 Distributor valve
4 Storage pressure accumulator
5 Brake valve device
6 Pneumatic spring bellows unit
7 Spring level valve unit
8 Storage pressure accumulator
9 Pressure control valve
10 Control valve unit
11 Tire
12 Compressor
13 Transmission unit
14 Air dryer unit
15 Coupling device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tire pressure controlling device for a tire of a vehicle wheel filled with compressed air, comprising:
    a control valve unit configured to control filling of the tire with compressed air and/or venting of the compressed air from the tire;
    a compressor that feeds the compressed air for the tire to produce a tire filling pressure; and
    a transmission unit coupling mechanical rotational movement of the vehicle wheel with a drive shaft of the compressor,
    wherein
        the compressor compresses air drawn in from the atmosphere and is driven by the mechanical rotational movement of the vehicle wheel via the transmission unit arranged therebetween, and
        the control valve unit is configured to electrically couple and uncouple a coupling device which is arranged on the drive shaft of the compressor such that the compressor is operable on a needs-based basis.

2. The tire pressure controlling device according to claim 1, wherein
    the transmission unit is configured as one of:
        a toothed transmission,
        a chain transmission,
        a belt transmission,
        a hydraulic pump and hydraulic motor arrangement, or
        an electric generator and motor arrangement.

3. The tire pressure controlling device according to claim 1, further comprising:
    an air dryer connected on an air outlet side of the compressor.

4. The tire pressure controlling device according to claim 1, further comprising:
    the coupling device configured to connect and disconnect drive power flux depending on need, wherein the coupling device is arranged between the compressor and the vehicle wheel whose mechanical rotational movement drives the compressor.

5. The tire pressure controlling device according to claim 4, wherein the need is a compressed air need of the tire that actuates the coupling device to connect the drive power flux.

6. A commercial vehicle trailer supplied with a system pressure by a traction vehicle via a coupling point, the commercial vehicle trailer comprising:
    the tire pressure controlling device according to claim 1, wherein the tire pressure controlling device is operated independently of the system pressure supplied by the traction vehicle.

7. The commercial vehicle trailer according to claim 6, further comprising:
    a pneumatic trailer braking system comprising a storage pressure accumulator and a brake valve device, the pneumatic trailer braking system being connected to the coupling point.

8. The commercial vehicle trailer according to claim 7, further comprising:
    a pneumatic suspension system comprising a pneumatic spring bellows unit of a suspension of a vehicle axle of the commercial vehicle trailer, a spring level valve unit acting upon the pneumatic spring bellows unit, and a supply pressure accumulator connected to the spring level valve unit, wherein the pneumatic suspension system is connected to the coupling point.

9. The commercial vehicle trailer according to claim 6, further comprising:
    a pneumatic suspension system comprising a pneumatic spring bellows unit of a suspension of a vehicle axle of the commercial vehicle trailer, a spring level valve unit acting upon the pneumatic spring bellows unit, and a supply pressure accumulator connected to the spring level valve unit, wherein the pneumatic suspension system is connected to the coupling point.

* * * * *